March 29, 1938. K. FRITZ 2,112,283

DIRECTION FINDING SYSTEM

Filed June 25, 1936

BEAM CARRIES MODULATION A DURING SWEEP a AND MODULATION B DURING SWEEP b

BEAM RECIPROCATES THRU ANGLE M S N, CARRYING MODULATIONS A' AND B' EACH APPROPRIATE TO ITS OWN SECTOR

A  B  A  B  A

A B   A B   A B

B A   B A   B A
TIME →

INVENTOR
KARL FRITZ
BY *H. S. Brown*
ATTORNEY

Patented Mar. 29, 1938

2,112,283

UNITED STATES PATENT OFFICE 2,112,283

DIRECTION FINDING SYSTEM

Karl Fritz, Berlin, Germany, assignor to Telefunken Gesellschaft für Drahtlose Telegraphie m. b. H., Berlin, Germany, a corporation of Germany Application June 25, 1936, Serial No. 87,195
In Germany May 27, 1935

9 Claims. (Cl. 250—11)

This invention relates to direction finders and more particularly to a radio beacon transmitting and receiving system wherein a beam of energy is directionally propagated from the transmitter and signals are received in such manner as to make different indications dependent upon the location of the receiver with respect to the directional axis of the beam.

Systems are known in which a single beam of radio energy may be wobbled back and forth through a small arc at a cyclic rate. U. S. Patent 1,934,078 to Ludenia shows one embodiment of such a system. My invention, however, is directed to certain improvements in direction finding systems such as will be hereinafter set forth in greater detail.

It is an object of my invention to provide suitable means for position finding, as for instance where a radio receiver is mounted on board mobile craft, so that the craft may be steered along a predetermined course as marked out by the median line of the arc through which a directional beam may be swung.

Figure 1:
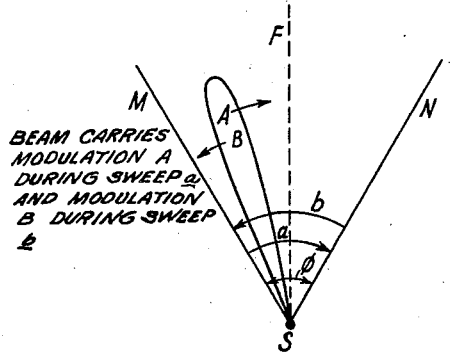
Figure 2:
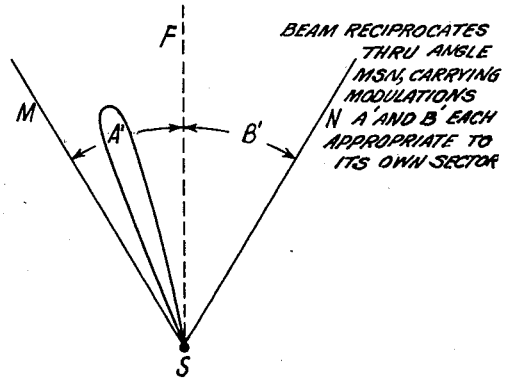
Figure 3:
Figure 4:
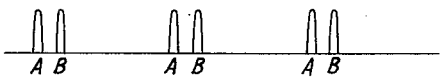
Figure 5:
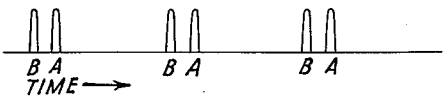
Figure 6:
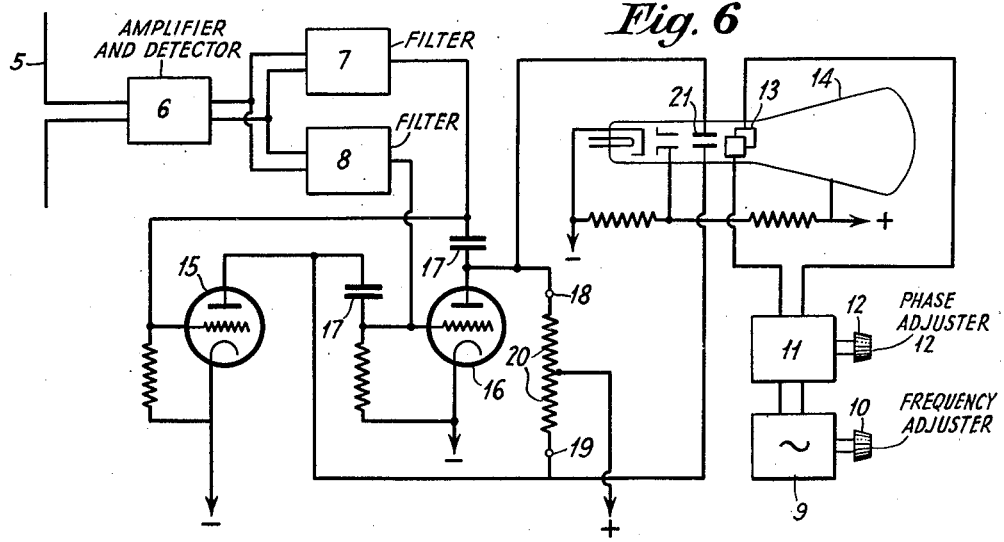
Figure 7:
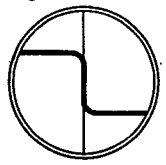
Figure 8:
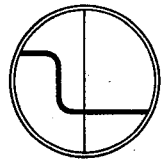
Figure 9:
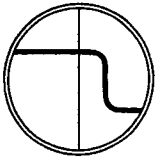

Other objects and advantages of my invention will be made apparent upon reading the following detailed description in connection with the accompanying drawing in which Figs. 1 and 2 are diagrams illustrating a preferred mode of propagating a directional beam;

Figs. 3, 4, and 5 are time scale diagrams illustrative of the manner in which direction signals may be received;

Fig. 6 is an illustrative circuit diagram of receiving apparatus suitable for carrying out my invention; and Figs. 7, 8, and 9 show respectively different indications which may be caused to appear on the fluorescent screen of a cathode ray tube, the use of which is suggested in combination with other apparatus for carrying out my invention.

As indicated in Fig. 1, a pencil or beam A of radiations may be caused to sweep in the direction $a$ inside the sector marked $\phi$ bounded by the edges or marginal lines M and N at a predetermined rate of speed. When the beam sweeps back in the direction $b$ it may be differently modulated. Hence it is labeled beam B. A receiver located inside the sector MN, during a cyclic period of swing or reciprocation will receive two time marks, and these will be exactly spaced apart as long as the craft is on the course marked FS.

In Fig. 2 I show a modification in which two alternate positions of a beam designated A' and B' respectively represent different modulations of the same carrier frequency. The modulations may be tonal, or suitable code impulses may be used in keying the carrier. It is to be understood, however, that at any instant it will be unnecessary to propagate more than one beam. The beam when it carries the modulation A' may be reciprocated between the median line FS and the limit MS. This reciprocation may be alternated with a corresponding reciprocation of the same beam when it carries the modulation B' between the median line FS and the boundary line NS.

Referring again to Fig. 1 where it is assumed that the keying or modulation of the carrier wave is at any two audio frequencies such as A and B, the signals may be heard coming in at the receiver and they will have equally spaced time intervals therebetween so long as the craft is held on the course FS. The time scale of the signals will then be as shown in Fig. 3. This figure shows the impulses alternately marked A and B for indicating the pick-up by the receiver of first one modulation and then the other, according to the direction in which the beam is moved.

Fig. 4 shows a dissymmetric arrangement of the impulses due to position of a craft off its course and to the left thereof, while Fig. 5 indicates a corresponding departure of a craft from its course to the right thereof. If, therefore, the beams A and B are differently modulated or keyed, the pilot may readily determine by the order in which these signals are received to which side of the course he has digressed.

In order to obtain a visual indication of left and right digression of the craft from the course which is marked out by the oscillating directional beam, it may be desirable to utilize a cathode ray tube in the manner shown in Fig. 6. Referring to this diagram I may, if desired, employ a dipole antenna 5 feeding to an amplifier and detector 6, the output from which may be fed in parallel to two filter systems 7 and 8 respectively. Let it be assumed that the filter 7 passes a modulation frequency or a side band for the beam A and that the filter 8 passes the other modulation frequency or side band for the beam B. Let it be assumed, also that respective beams A and B swing fully across the arc $\phi$ which is bounded by the lines MS and NS, and that each beam swings uni-directionally and alternately with the other beam. It will readily be seen from Figs. 1 and 2 that the time interval between the moment of passage of beam A across the median line and the subsequent moment of passage of the beam B thereacross will be equal to the next ensuing time interval up to the next passage of the beam A thereacross. It will also be observed that these time intervals will become unequal at any point to the left or to the right of the course FS. It remains, therefore, to provide in the indicating apparatus at the receiver a timing means for comparing the duration of successive intervals as defined by the moments of reception of the beam at the point where the receiver is located.

Such a timing means may include an oscillator 9, the frequency of which may be varied within suitable limits by means of a manual control 10, so that this oscillator may be synchronized with the frequency at which the directional beam is swung to and fro through the arc φ. The output from the oscillator 9 may then be fed through a phase adjuster 11 having a manual control 12 and thence to a pair of deflecting plates 13 for horizontally oscillating a cathode ray within the tube 14. These oscillations are then utilized in the well known manner of operation of an ordinary cathode ray tube oscilloscope. The vertical component of the graph is produced by means of an impress of signals from the receiver in the following manner:

The signals A may be impressed upon the grid of an electron discharge tube 15 which is one of a pair of tubes connected up as in a multivibrator. The other tube 16 has its grid connected to the output of the filter 8. The natural period of oscillation of the multivibrator should be made slower than the maximum time that will elapse between successive impulses if filtered through the filtering systems 7 and 8 respectively. Hence the multivibrator constituted by the tubes 15 and 16 will be "driven" by the incoming signal. Each time a signal comes in it will render one or the other of the tubes 15, 16 conductive. The consequent lowering of potential in the anode of the tube which becomes conductive will operate to block the other tube because of the crosscouplings of the capacitors 17 respectively between the anode of one tube and the grid of the other tube. Hence the multivibrator will produce differences of potential between the terminals 18 and 19 of a potentiometer 20 such as to reverse the static charge upon the vertical deflector plates 21 within the cathode ray tube 14. The curve delineated by the beam in the cathode ray tube will appear as shown in Figs. 7, 8, and 9 depending upon the position which is occupied by the receiver at the moment.

In Fig. 7 the spot on the fluorescent screen of the cathode ray tube is indicated as following two horizontal lines with a substantially vertical line interconnecting the same. The vertical line is at the center of the screen and indicates a coincidence of the up and down strokes of the spot, conversely if the up stroke and the down stroke of the spot in a vertical direction do not coincide then they can be made to do so by readjusting the frequency and phase of the locally produced oscillations. The frequency and phase adjusters 10 and 12 respectively are assumed to have been set in proper position for attaining this coincidence, that is to say, for synchronizing and phasing-in the locally generated oscillations with respect to cyclic swings of the radio beam.

When the vessel departs to the left from its established course, that is in the zone FSN, then the time intervals elapsing between successively received impulses A and B will be reduced thereby shifting the vertical line followed by the spot on the screen to the left from the center line of the screen ass hown in Fig. 8. If, however, the vessel digresses to the right of its course, the time interval elapsing between the reception of signal B and the subsequent reception of signal A would be reduced and this will cause a shifting of the vertical line to the right of the center line of the screen as shown in Fig. 9.

It will thus be seen that I have provided the means for obtaining left and right indications for the guidance of a pilot. It will be understood, however, that the specific embodiment of my invention herein shown and described is merely illustrative. Variations may be made by those skilled in the art without departing from the spirit of the invention. The scope of the invention therefore is to be understod as having all the breadth that is permitted by the claims themselves.

I claim:

1. In a direction finding system, a transmitter having a directive beam emitter and means for oscillating the directional axis of said beam within a restricted arc, means for applying to said beam modulations of one characteristic while the axis of said beam is swung from right to left and for applying to said beam modulations of a different characteristic while the axis of said beam is swung from left to right, and receiving apparatus having means for visually comparing the time intervals elapsing between successive passages of the beam across the directional line between the transmitter and the receiver.

2. A system in accordance with claim 1 and having means associated with said comparing means whereby the impulses accompanying a right-to-left swing of said beam may be distinguished from impulses accompanying a left-to-right swing of said beam.

3. A system in accordance with claim 1 and having means associated with said comparing means whereby the impulses to one side of a median line of said restricted arc may be distinguished from the impulses to the other side of said median line.

4. A direction finding receiver responsive to modulated signals which are propagated from a directionally oscillating transmitter, means in said receiver for distinguishing the modulations which accompany a left-to-right orientation of said transmitter from the modulations accompanying a right-to-left orientation thereof, and means including an oscilloscope having an electron deflector responsive to said signals for denoting the relative time intervals which elapse between successive moments of interception of said signals.

5. A receiver in accordance with claim 4 and having timing means including a local oscillator and an additional electron deflector in said oscilloscope operable in response to periodic impulses from said oscillator for indicating an on-the-course position of the receiver when successive ones of said time intervals are substantially equal.

6. A receiver in accordance with claim 4 and having timing means including a local oscillator and an additional electron deflector in said oscilloscope operable in response to periodic impulses from said oscillator for distinguishing between the irregular recurrence of interception of said signals to one side of a course and to the other side thereof.

7. In a direction finding receiver, an amplifier and detector, a pair of modulation-frequency filters connected in parallel and connected to the output side of said detector, an oscilloscope having cathode ray deflecting means operable to produce horizontal and vertical components, an oscillator and phase adjuster operable upon said deflecting means to produce one component thereof in synchronism with a succession of periodic signals, and means connected between said filters and said deflecting means for producing another component of deflection in accordance with the moments of interception of said signals.

8. A receiver in accordance with claim 7 and having frequency controlling means for synchronizing said oscillator with said periodic signals.

9. The method of indicating a course to be followed by mobile craft which carries a receiver responsive to directional signals propagated by a directionally oscillating beam transmitter which comprises the steps of modulating said signals by one characteristic while the beam swings from right-to-left and by another characteristic while the beam swings in the reverse direction, detecting and selectively filtering said signals in accordance with the modulations thereof, and timing the successive interceptions of said signals by said receiver as the beam traverses a straight line from said transmitter to said receiver.

KARL FRITZ.